United States Patent
Kubo et al.

(10) Patent No.: US 7,921,662 B2
(45) Date of Patent: Apr. 12, 2011

(54) HYDROGEN TANK COOLING DEVICE AND COOLING METHOD IN HYDROGEN FUEL AUTOMOBILE, AND HYDROGEN FUEL AUTOMOBILE

(75) Inventors: Hidehito Kubo, Kariya (JP); Daigoro Mori, Mishima (JP)

(73) Assignees: Kabushiki Kaisha Toyota Jidoshokki, Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 506 days.

(21) Appl. No.: 11/791,068

(22) PCT Filed: Nov. 17, 2005

(86) PCT No.: PCT/JP2005/021122
§ 371 (c)(1),
(2), (4) Date: Jan. 9, 2008

(87) PCT Pub. No.: WO2006/054642
PCT Pub. Date: May 26, 2006

(65) Prior Publication Data
US 2008/0250804 A1 Oct. 16, 2008

(30) Foreign Application Priority Data
Nov. 18, 2004 (JP) .................... 2004-334042

(51) Int. Cl.
*B60H 1/32* (2006.01)
*F25B 27/00* (2006.01)
(52) U.S. Cl. ........ 62/239; 62/323.1; 62/323.2; 62/323.3
(58) Field of Classification Search ............. 62/239, 62/323.1, 199–200, 46.1, 238.6, 198, 196.4, 62/344; 429/20, 24, 26; 165/42, 41, 51; 180/68.4
See application file for complete search history.

(56) References Cited

U.S. PATENT DOCUMENTS
5,678,410 A 10/1997 Fujita et al.
(Continued)

FOREIGN PATENT DOCUMENTS
FR 2 830 926 4/2003
(Continued)

OTHER PUBLICATIONS

European Search Report dated Dec. 6, 2007 issued by European Patent Office for application No. 05807058.2-1254 PCT/JP2005021122.

(Continued)

*Primary Examiner* — Cheryl J Tyler
*Assistant Examiner* — Cassey Bauer
(74) *Attorney, Agent, or Firm* — Locke Lord Bissell & Liddell LLP

(57) ABSTRACT

A hydrogen fuel automobile has a heat medium passage through which a heat medium which can exchange heat with a drive portion and can be supplied to a heat medium pipe for a hydrogen tank flows. An air cooling apparatus has a compressor for compressing a refrigerant gas, a condenser, an evaporator and a refrigerant circuit. The hydrogen fuel automobile is provided with a bypass passage which branches from the refrigerant circuit so that expanded refrigerant liquid detours the evaporator so as to be drawn into the compressor. A switch portion can switch between a state where the refrigerant liquid passes through the evaporator so as to be drawn into the compressor and a state where the refrigerant liquid detours the evaporator so as to flow through the bypass passage. The hydrogen storage material cooling portion cools the hydrogen storage material in the hydrogen tank using the refrigerant liquid that flows through the bypass passage. Accordingly, the time for filling the tank with hydrogen can be made short in comparison with a case where the radiator and the fan mounted in the automobile are used to cool the hydrogen tank when the tank is being filled with hydrogen.

8 Claims, 3 Drawing Sheets

U.S. PATENT DOCUMENTS

| | | |
|---|---|---|
| 6,202,710 B1 * | 3/2001 | Dill et al. .................. 141/94 |
| 6,810,952 B2 * | 11/2004 | Fredj et al. ................ 165/202 |
| 2002/0045079 A1 | 4/2002 | Shimada et al. |
| 2002/0127448 A1 | 9/2002 | Derflinger et al. |
| 2004/0060312 A1 | 4/2004 | Horn et al. |
| 2005/0061497 A1 * | 3/2005 | Amaral et al. .............. 165/202 |

FOREIGN PATENT DOCUMENTS

| | | |
|---|---|---|
| JP | 62-68115 | 3/1987 |
| JP | 7-186711 | 7/1995 |
| JP | 2000-88196 | 3/2000 |
| JP | 2001-239847 | 9/2001 |
| JP | 2001-277871 | 10/2001 |
| JP | 2004-211721 | 7/2004 |
| JP | 2004-232777 | 8/2004 |
| WO | WO 03/031884 * | 4/2003 |

OTHER PUBLICATIONS

International Search Report for corresponding International PCT application No. PCT/JP2005/021122, dated Jan. 13, 2006.

English translation of the International Preliminary Report on Patentability dated Aug. 23, 2007, Application No. PCT/JP2005/021122.

* cited by examiner

HYDROGEN TANK COOLING DEVICE AND COOLING METHOD IN HYDROGEN FUEL AUTOMOBILE, AND HYDROGEN FUEL AUTOMOBILE

FIELD OF THE INVENTION

The present invention relates to a hydrogen tank cooling device and cooling method in a hydrogen fuel automobile, and a hydrogen fuel automobile. In particular, the present invention relates to a technology for allowing a hydrogen tank to be filled with hydrogen in a short period of time in comparison with the prior art in a hydrogen fuel automobile in which a hydrogen tank having a hydrogen storage material inside and an air cooling apparatus are mounted.

BACKGROUND OF THE INVENTION

In recent years, awareness in terms of the need to control global warming has been rising, and in particular, hydrogen fuel automobiles using hydrogen as fuel, such as fuel cell electric automobiles and hydrogen engine automobiles, have been actively developed for the purpose of reducing carbon dioxide discharged from vehicles. A hydrogen tank which is filled with hydrogen gas is mounted as a hydrogen supply source in general hydrogen fuel automobiles.

In methods for storing and transporting hydrogen, use of metals referred to as "hydrogen storage alloys" which store hydrogen so as to become hydride under certain temperature and pressure conditions and release hydrogen under different temperature and pressure conditions when necessary, has been drawing attention. Hydrogen tanks using a hydrogen storage alloy can store more hydrogen than a tank with the same volume, and therefore, have been drawing attention.

Hydrogen tanks are filled with hydrogen gas at installations referred to as hydrogen stations, which correspond to gas stations and LP gas stations. Hydrogen stations are provided with, for example, hydrogen multi-cylinder frames containing a number of cylinders and dispensers for filling the hydrogen tank of vehicles with hydrogen supplied from the hydrogen multi-cylinder frame. In addition, the hydrogen tank is filled with hydrogen gas using the difference in pressure between the hydrogen multi-cylinder frame and the hydrogen tank in such a state that a coupler provided at the end of the hose of the dispenser is linked to the opening for filling the above described hydrogen tank.

While the hydrogen tank is being filled with hydrogen gas, the temperature inside the hydrogen tank becomes high, and therefore, it takes time to fill the hydrogen tank with hydrogen gas, unless the hydrogen tank is filled with hydrogen gas while being cooled. In addition, in the case where the amount of hydrogen with which the hydrogen tank is filled is increased by making a hydrogen storage alloy store hydrogen, the hydrogen storage reaction in the hydrogen storage alloy is an exothermal reaction, and therefore, the hydrogen storage reaction does not progress smoothly, unless the hydrogen tank is cooled.

It is possible for fuel cell automobiles with a hydrogen tank having a hydrogen storage alloy inside to have such a system that a heat medium after cooling the fuel cell is used as the heat medium for heating the hydrogen storage alloy when hydrogen is released from the hydrogen storage alloy, and the same heat medium is used as the heat medium for cooling the hydrogen storage alloy when the hydrogen storage alloy stores hydrogen. In this system, the heat medium is cooled by a radiator which is mounted in the fuel cell automobile. In addition, when the fuel cell operates, the hydrogen storage alloy is heated by the heat medium after cooling the fuel cell, so that hydrogen is released smoothly, and when the hydrogen tank is being filled with hydrogen, the fuel cell stops operating, and the heat medium cooled by the radiator is used for cooling the hydrogen storage alloy instead of for cooling the fuel cell. In this case, when the fuel cell operates, the fuel cell is cooled and the hydrogen storage alloy is heated smoothly by the heat medium.

However, in the case where the hydrogen storage alloy stores hydrogen, that is to say, when the hydrogen tank is being filled with a large amount (for example, 5 kg) of hydrogen in a short period of time (for example, within 5 minutes) under high pressure (for example, 35 MPa), general radiators and fans for automobile use lack the ability to release heat generated in the hydrogen storage alloy and heat resulting from gas compression to the outside.

The ratio of hydrogen fuel automobiles equipped with an air-conditioning apparatus or an air-cooling apparatus is high, as is that of automobiles having an internal combustion engine. Japanese Laid-Open Patent Publication No. 7-186711 discloses a hydrogen fuel automobile having an air cooling apparatus having a condenser for condensing a compressed refrigerant gas and an evaporator for evaporating an expanded refrigerant liquid, and a heat exchanging apparatus which is provided inside the tank having a hydrogen storage alloy inside and forms a portion of a heated refrigerant passage. The above described heat exchanging apparatus has a first heat exchanger provided inside the tank having a hydrogen storage alloy inside and a second heat exchanger provided in at least either the passage for air cooled by the above described air cooling apparatus or the passage for cooling air that cools the condenser of the air cooling apparatus. This hydrogen fuel automobile is provided with a heat exchanging apparatus separately from the air cooling apparatus, and cold energy in the hydrogen storage alloy accompanying the release of hydrogen from the hydrogen storage alloy is conveyed to the refrigerant of the heat exchanging apparatus through the first heat exchanger, and cold energy that is conveyed to this refrigerant is conveyed to the air in the air cooling apparatus or air for cooling the condenser in the air cooling apparatus through the second heat exchanger. That is to say, the cold energy of the hydrogen storage alloy is used to reduce energy consumption in the air cooling apparatus.

In addition, Japanese Laid-Open Patent Publication No. 2000-88196 discloses a hydrogen storage alloy system mounted in an automobile, which is provided with a heat medium circulation system, a cooling portion for cooling the heat medium, and a heating portion for heating the heat medium. The heat medium circulation system allows a heat medium to circulate through the hydrogen storage alloy mounted in the vehicle, so that heat is exchanged between the heat medium and the above described hydrogen storage alloy. This hydrogen storage alloy system mounted in an automobile selectively makes the above described cooling portion and the above described heating portion operate when the above described hydrogen storage alloy is being filled with hydrogen or when hydrogen is released from the above described hydrogen storage alloy, respectively.

In the case where the hydrogen tank is filled with hydrogen at an outdoor temperature of 30° C. in such a state that a radiator and a fan mounted in a general automobile (for example with an amount of flow of cooling water: 60 L/min, wind velocity: maximum 2 m/sec) are operating, the hydrogen tank can be filled to only approximately 85% (4.25 kg) of the amount of hydrogen with which the tank is filled when full, after five minutes have elapsed starting from a state where the hydrogen tank is empty. In order for the hydrogen tank to be filled with hydrogen to an amount of 95% (4.75 kg) or more of hydrogen with which the tank is filled to the fullest in five minutes, it is necessary for the wind velocity from the fan to be no less than 6 m/sec. In the case where a fan which can provide this wind velocity is mounted in a fuel cell automobile, however, a large space for installation becomes necessary, and the fuel cell automobile ends up being equipped with a fan of which the performance is excessive at all times except when the tank is being filled with hydrogen.

Japanese Laid-Open Patent Publication No. 7-186711 describes use of cold energy from the hydrogen storage alloy accompanying release of hydrogen from the hydrogen storage alloy inside a tank having a hydrogen storage alloy inside for cooling air in the air cooling apparatus or cooling air that cools the condenser in the air cooling apparatus. Japanese Laid-Open Patent Publication No. 7-186711, however, does not have any description in terms of the tank having a hydrogen storage alloy inside being filled with hydrogen in a short period of time.

Japanese Laid-Open Patent Publication No. 2000-88196 has as an objective to make it possible to fill a hydrogen storage alloy with hydrogen in such a state that the hydrogen storage alloy is mounted in a vehicle (in an on-board state). Japanese Laid-Open Patent Publication No. 2000-88196, however, does not have any description concerning the objective of the present invention to fill a hydrogen tank with hydrogen in a short period of time in comparison with a case where the hydrogen tank is cooled using the radiator and the fan mounted in the automobile.

SUMMARY OF THE INVENTION

An objective of the present invention is to provide a hydrogen tank cooling device in a hydrogen fuel automobile which can make the time for filling the tank with hydrogen short in comparison with a case where the hydrogen tank is cooled using the radiator and the fan mounted in the automobile when the tank is filled with hydrogen. Furthermore, the present invention provides a hydrogen tank cooling method and a hydrogen fuel automobile.

In order to achieve the above described objective, the present invention provides a hydrogen tank cooling device for a hydrogen fuel automobile. The hydrogen fuel automobile includes a hydrogen tank containing a hydrogen storage material and a heat exchanger inside. The heat exchanger includes a heat medium pipe through which a heat medium flows. A drive portion drives the vehicle using hydrogen supplied from the hydrogen tank as fuel. The hydrogen fuel automobile has a heat medium passage through which a heat medium which can exchange heat with the drive portion and can be supplied into the heat medium pipe, and a radiator for cooling the heat medium that flows through the heat medium passage. The air cooling apparatus has a compressor for compressing a refrigerant gas, a condenser for condensing the compressed refrigerant gas, an evaporator for making expanded refrigerant liquid evaporate, and a refrigerant circuit. The refrigerant circuit is provided with the compressor, condenser, and evaporator. The hydrogen fuel automobile is provided with a bypass passage which branches from the refrigerant circuit so that expanded refrigerant liquid detours the evaporator so as to be drawn into the compressor. A switch portion can switch between a state where the refrigerant liquid passes through the evaporator so as to be drawn into the compressor and a state where the refrigerant liquid detours the evaporator so as to flow through the bypass passage. The hydrogen storage material cooling portion cools the hydrogen storage material using the refrigerant liquid that flows through the bypass passage.

The present invention further provides a hydrogen tank cooling method used when a hydrogen tank mounted in a hydrogen fuel automobile is filled with hydrogen. The hydrogen fuel automobile is provided with a heat medium passage through which a heat medium for cooling the hydrogen tank flows, a radiator for cooling the heat medium that flows through the heat medium passage, and an air cooling apparatus. The cooling method includes the steps of driving a fan in order to blow wind against the radiator and driving the air cooling apparatus when the hydrogen tank is being filled with hydrogen, and aiding cooling of the hydrogen tank by the refrigerant in the air cooling apparatus.

The present invention further provides a hydrogen fuel automobile. This hydrogen fuel automobile is provided with: a hydrogen tank containing a hydrogen storage material and having a heat exchanger inside, wherein the heat exchanger includes a heat medium pipe through which a heat medium flows; a drive portion for driving the vehicle using hydrogen supplied from the hydrogen tank as fuel; a heat medium passage through which a heat medium that can exchange heat with the drive portion and can be supplied to the heat medium pipe flows; and a radiator for cooling the heat medium that flows through the heat medium passage. The air cooling apparatus has a compressor for compressing a refrigerant gas, a condenser for condensing the compressed refrigerant gas, an evaporator for making expanded refrigerant liquid evaporate, and a refrigerant circuit. The refrigerant circuit is provided with the compressor, condenser, and evaporator. A bypass passage branches from the refrigerant circuit, so that expanded refrigerant liquid detours the evaporator so as to be drawn into the compressor. A switch portion can switch between a state where the refrigerant liquid passes through the evaporator so as to be drawn into the compressor and a state where the refrigerant liquid detours the evaporator so as to flow through the bypass passage. A hydrogen storage material cooling portion cools the hydrogen storage material using the refrigerant liquid that flows through the bypass passage.

DETAILED DESCRIPTION OF THE PREFERRED EMBODIMENTS

In the following, a first embodiment of the present invention will be described.

Figure 2:
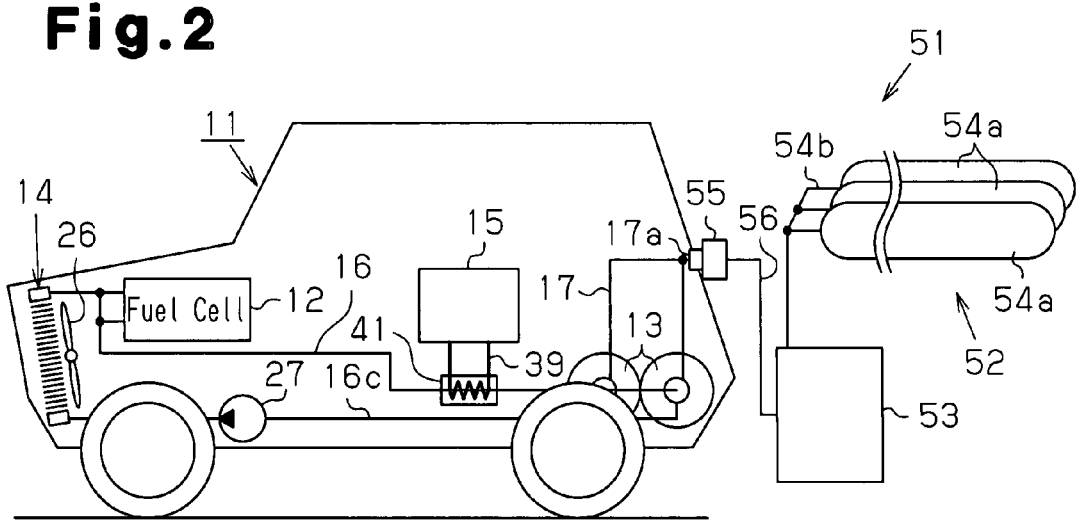
FIG. 2 is a schematic diagram showing the configuration of a hydrogen fuel automobile and a hydrogen station.

As shown in FIG. 2, a hydrogen fuel automobile 11 is provided with a fuel cell 12 as a hydrogen fuel drive portion for driving the vehicle, two hydrogen tanks 13, a radiator 14 and an air cooling apparatus 15. The fuel cell 12, the hydrogen tanks 13, and the radiator 14 are linked via a heat medium passage 16 which makes it possible to supply a heat medium for cooling the fuel cell 12 to the hydrogen tanks 13. The hydrogen tanks 13 are linked to a pipe 17 having an opening for filling the tanks 13 with hydrogen filling port 17a. It is possible to fill the respective hydrogen tanks 13 with a hydrogen gas through the pipe 17.

In addition, the hydrogen fuel automobile 11 is formed in such a manner that the hydrogen tanks 13 can be filled with hydrogen gas at a hydrogen station 51. The hydrogen station 51 is provided with a gas storing installation 52 for storing hydrogen gas and a dispenser 53 for filling the hydrogen tanks 13 in the hydrogen fuel automobile 11 with a hydrogen gas supplied from the gas storing installation 52. In FIG. 2, the proportions in terms of the size of the hydrogen fuel automobile 11, the gas storing installation 52, and the dispenser 53 are different from the actual proportions.

The gas storing installation 52 in the hydrogen station 51 is formed of a hydrogen multi-cylinder frame where a number of cylinders 54a which are filled with hydrogen gas under predetermined pressure are linked with pipes 54b. Though FIG. 2 shows three cylinders 54a for the sake of convenience, the actual number of cylinders 54a can be, for example, ten or more. The respective cylinders 54a are filled with hydrogen gas under predetermined pressure (for example, 44 MPa) to such a state as to be filled to the fullest. The dispenser 53 is provided with a hose 56 with a coupler 55 provided at the end, and equipped, for example, with a mass flow meter, a flow adjusting valve, and an opening and closing valve (none of these are shown), and thus, has a well known configuration for filling the tanks with hydrogen gas supplied from the hydrogen multi-cylinder frame via the hose 56. The coupler 55 is linked to the hydrogen filling port 17a for filling the hydrogen tanks 13 with hydrogen when the dispenser 53 fills the hydrogen tanks with hydrogen.

Figure 1:
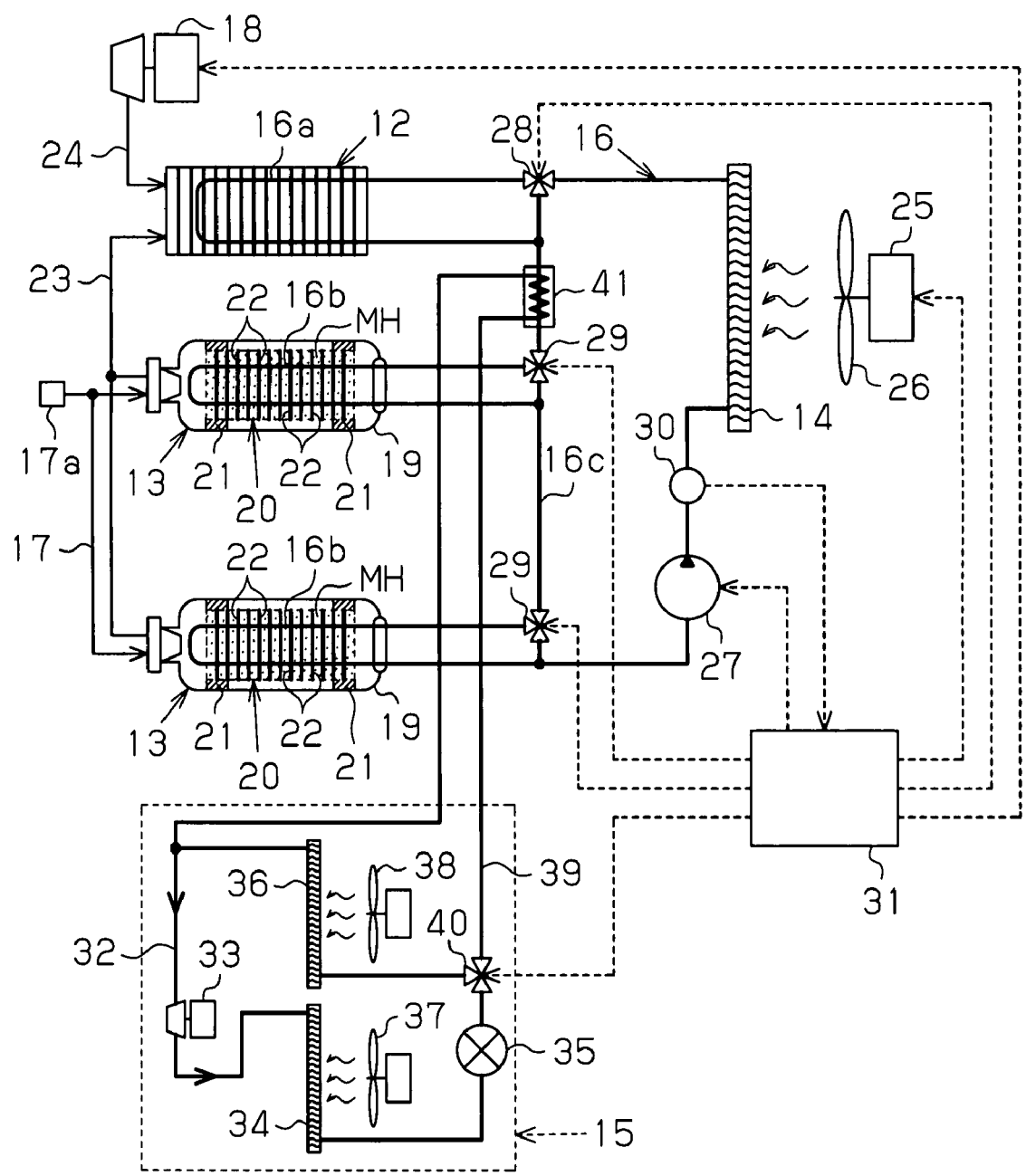
FIG. 1 is a schematic diagram showing a passage through which a heat medium and a refrigerant for an air cooling apparatus pass according to a first embodiment of the present invention.

Next, a fuel cell system will be described in detail in reference to FIG. 1.

A fuel cell 12 is formed as, for example, a solid polymer type fuel cell where hydrogen supplied from the hydrogen tanks 13 reacts with oxygen in air supplied from an air compressor 18, so that electrical energy of a direct current (direct current power) is generated. In order to make it possible to cool the fuel cell 12 at the time of normal operation, a portion of the heat medium passage 16 is placed inside the fuel cell 12 as a first heat exchanging portion 16a.

The hydrogen tanks 13 are provided with a tank main body 19, a unit for storing hydrogen 20 which contains a hydrogen storage alloy MH inside as a hydrogen storage material, and supports 21 for supporting the unit for storing hydrogen 20 within the tank main body 19. In addition, a portion of the heat medium passage 16, which is a passage for a heat medium that exchanges heat with the hydrogen storage alloy MH, is placed within the hydrogen tanks 13 as a second heat exchanging portion 16b. An LLC (long life coolant) is used as the heat medium in this embodiment. A great number of fins 22 are provided around the second heat exchanging portions 16b, in order to increase the efficiency when heat is exchanged with the hydrogen storage alloy MH. A well known hydrogen storage alloy is used as the hydrogen alloy MH. The second heat exchanging portions 16b and the fins 22 form a heat exchanger, and the second heat exchanging portions 16b form a heat medium pipe for the heat exchanger.

Each hydrogen tank 13 is linked to a hydrogen supplying port (not shown) of the fuel cell 12 via a pipe 23, so as to supply hydrogen to the fuel cell 12. The hydrogen tanks 13 store hydrogen under predetermined high pressure (for example approximately 35 MPa) in such a state as to be filled to the fullest, and reduces the pressure through a pressure reducing valve, not shown, so as to supply hydrogen to the fuel cell 12 under constant pressure (for example approximately 0.3 MPa). Each hydrogen tank 13 is linked to a pipe 17 having a hydrogen filling port 17a, so that it is possible to simultaneously fill a number of hydrogen tanks 13 with hydrogen gas through the pipe 17.

An air compressor 18 is linked to an oxygen supplying port (not shown) of the fuel cell 12 via a pipe 24 so as to supply compressed air to the fuel cell 12. The air compressor 18 compresses air from which dust and the like have been removed using an air cleaner, not shown, and discharges the air into the pipe 24.

A radiator 14 is provided with a fan 26 which is rotated by a motor 25. Wind sent by the fan 26 allows heat to be released from the radiator 14 efficiently.

A first electromagnetic three way valve 28, which is a second switch portion, is provided midway between the inlet of the first heat exchanging portion 16a and the outlet of the radiator 14. The heat medium passage 16 includes a main flow portion 16c between the first electromagnetic three way valve 28 and the connection to the inlet of the radiator 14. The first electromagnetic three way valve 28 is formed in such a manner that it is possible to switch between a state where heat medium coming from the radiator 14 is supplied to the inlet of the first heat exchanging portion 16a in the fuel cell 12 and a state where heat medium coming from the radiator 14 flows through the main flow portion 16c without being supplied to the first heat exchanging portion 16a. The main flow portion 16c is provided with second electromagnetic three way valves 29 of which the number is the same as that of hydrogen tanks 13. The outlet of the first heat exchanging portion 16a is linked to the main flow portion 16c upstream from all of the second electromagnetic three way valves 29. In addition, a pump 27 is provided in the main flow portion 16c downstream from all of the second electromagnetic three way valves 29. The pump 27 sends heat medium within the heat medium passage 16 to the inlet of the radiator 14.

The inlet of the second heat exchanging portion 16b of each hydrogen tank 13 is linked to the main flow portion 16c via a second electromagnetic three way valve 29. In addition, the outlet of each second heat exchanging portion 16b is linked to the main flow portion 16c downstream from the second electromagnetic three way valve 29 corresponding to the same second heat exchanging portion 16b. Each second electromagnetic three way valve 29 is formed in such a manner that it is possible to switch between a first state where heat medium flowing through the main flow portion 16c can only go to the inlet of the second heat exchanging portion 16b corresponding to the same second electromagnetic three way valve 29 and a second state where heat medium flowing through the main flow portion 16c can only go downstream from the main flow portion 16c instead of to the inlet of the second heat exchanging portion 16b. A temperature sensor 30 for detecting the temperature of the heat medium which flows into the radiator 14 is provided in the vicinity of the inlet of the radiator 14 in the main flow portion 16c.

The air compressor 18, motor 25, pump 27, first electromagnetic three way valve 28, and second electromagnetic three way valves 29 are controlled so as to be switched by means of an instruction from a controller 31. It is possible for the pump 27 to be driven and stopped, and for it to change the amount of flow on the basis of an instruction signal from the controller 31. A detection signal from the temperature sensor 30, a detection signal from a temperature sensor for detecting the temperature of the fuel cell 12 (not shown), and a detection signal from a pressure sensor for detecting the pressure inside the hydrogen tanks 13 (not shown) are input into the controller 31. The controller 31 outputs an instruction signal for changing the displacement of a refrigerant compressor 33 to a cooling apparatus controller on the basis of the detection signal from the temperature sensor 30 when the hydrogen tanks 13 are being filled with hydrogen. That is to say, the controller 31 functions as a control portion for controlling the displacement of the refrigerant compressor 33 in accordance with the temperature of the heat medium that flows through the heat medium passage 16.

The air cooling apparatus 15 uses chlorofluorocarbons as the refrigerant. The refrigerant circuit 32 in the air cooling apparatus 15 is provided with a refrigerant compressor 33 for compressing a refrigerant gas, a condenser 34 for condensing the compressed refrigerant gas, an expansion valve 35 and an evaporator 36 for making expanded refrigerant liquid evaporate. The condenser 34 cools refrigerant gas which is discharged from the refrigerant compressor 33 under high pressure and at a high temperature using a fan 37, and converts the refrigerant gas to a liquid refrigerant under high pressure. The expansion valve 35 converts the liquid refrigerant under high pressure to a refrigerant in mist form under low pressure. The evaporator 36 causes the refrigerant in mist form to evaporate, so that air sent by a fan 38 is cooled by latent heat of evaporation in the refrigerant. The refrigerant compressor 33 is formed in such a manner that the displacement, that is to say, the cooling performance, can be changed by means of an instruction from the air cooling apparatus controller (not shown). A well known air cooling apparatus mounted in an automobile can be used as the air cooling apparatus 15. The air cooling apparatus controller is formed in such a manner that the displacement of the refrigerant compressor 33 can be adjusted by means of an instruction signal from the controller 31.

A bypass passage 39 through which expanded refrigerant liquid detours the evaporator 36 so as to become of such a state as to be drawn into the refrigerant compressor 33 branches from the refrigerant circuit 32 in the air cooling apparatus 15. A third electromagnetic three way valve 40, which is a switch portion in claim 1 and a first switch portion in claim 7, is provided in the branch portion close to the expansion valve 35 in the bypass passage 39. The third electromagnetic three way valve 40 is formed in such a manner that it is possible to switch between a state where refrigerant liquid coming from the expansion valve 35 passes through the evaporator 36 so as to be drawn into the refrigerant compressor 33 and a state where the refrigerant liquid detours the evaporator 36 so as to flow through the bypass passage 39. The third electromagnetic three way valve 40 is controlled so as to be switched by means of an instruction signal from the controller 31.

A heat exchanger 41 is provided in a portion downstream from the connection portion of the main flow portion 16c to the outlet of the first heat exchanging portion 16a, and upstream from the upstream one of the second electromagnetic three way valves 29. The heat exchanger 41 exchanges heat between the refrigerant that flows through the bypass passage 39 and the heat medium that flows through the heat medium passage 16. A portion of the bypass passage 39 passes through the heat exchanger 41 and is arranged so as to be wound around the heat medium passage 16 in helix form inside the heat exchanger 41. The heat exchanger 41 forms a hydrogen storage material cooling portion for cooling the hydrogen storage alloy MH with the refrigerant liquid that flows through the bypass passage 39. According to the present embodiment, the refrigerant liquid that flows through the bypass passage 39 indirectly cools the hydrogen storage alloy MH via the heat medium that flows through the heat medium passage 16.

The hydrogen fuel automobile 11 is provided with a secondary battery, not shown, for supplying power to the air cooling apparatus 15, the motor 25 and the like when the fuel cell 12 cannot be used, for example when the hydrogen tanks 13 are being filled with hydrogen, and for charging with extra power generated by the fuel cell 12.

Next, an operation of the apparatus having the above described configuration will be described.

The fuel cell 12 operates normally in the case where the surrounding temperature is a preset temperature or higher (set temperature) at which power generation of the fuel cell 12 is possible. The controller 31 operates normally from the startup in the case where the surrounding temperature is the above described set temperature or higher on the basis of the detection signal from the temperature sensor (not shown), which measures the surrounding temperature, and in the case where the surrounding temperature is less than the set temperature, the system is warmed up and goes into normal operation. At the time of normal operation, hydrogen is supplied from the hydrogen tanks 13 to the anode electrode of the fuel cell 12. In addition, the air compressor 18 is driven, and air is compressed to a predetermined pressure and supplied to the cathode electrode of the fuel cell 12.

In addition, solid polymer type fuel cells generate power efficiently at approximately 80° C., and the chemical reaction between hydrogen and oxygen is an exothermal reaction, and therefore, the temperature of the fuel cell 12 rises above the appropriate temperature of approximately 80° C., due to the heat of reaction when power generation continues in the fuel cell 12. In order to prevent such rising of the temperature, heat medium cooled by the radiator 14 is circulated within the heat medium passage 16. In addition, release of hydrogen from the hydrogen storage alloy MH is an endothermal reaction, and therefore, it is necessary to heat the hydrogen storage alloy MH, in order to make the reaction progress smoothly. Accordingly, the heat medium cools the fuel cell 12 during power generation so as to be warmed, and after that, heats the hydrogen storage alloy MH, so that hydrogen is released from the hydrogen tanks 13.

The controller 31 keeps the first electromagnetic three way valve 28 in such a state that the heat medium is supplied to the inlet of the first heat exchanging portion 16a at the time of operation of the fuel cell 12, and carries out switch control on the respective second electromagnetic three way valves 29 on the basis of the detection signal from the pressure sensor, which detects the pressure within the hydrogen tanks 13. When the pressure within one of the hydrogen tanks 13 becomes a first set pressure that has been preset or lower, the controller 31 outputs an instruction signal for switching the second electromagnetic three way valve 29 to such a state that the heat medium heats the hydrogen tank 13, that is to say, to such a state that the heat medium flows through the corresponding second heat exchanging portion 16b. In addition, when the pressure within one of the hydrogen tanks 13 becomes a second set pressure that has been preset or higher, the controller 31 outputs an instruction signal for switching the second electromagnetic three way valve 29 to such a state that the heat medium does not flow through the hydrogen tank 13.

The controller 31 determines that it is necessary to fill the hydrogen tanks 13 with hydrogen at the point in time when all of the hydrogen tanks 13 have become of such a state that the first set pressure cannot be reached even when heating by the heat medium continues for a predetermined period of time that has been preset. Then, the controller 31 drives an alerting portion (for example a display portion, such as a lamp).

When the hydrogen tanks 13 are filled with (store) hydrogen gas (at the time when the tanks are filled with hydrogen), that is to say, in the case where the hydrogen storage alloy MH stores hydrogen gas, the hydrogen fuel automobile 11 is parked at the hydrogen station 51. The controller 31 outputs an instruction signal for switching the valve to such a state that the heat medium is not supplied to the first heat exchanging portion 16a of the fuel cell 12 but flows through the main flow portion 16c to the first electromagnetic three way valve 28 at the time when the tanks are filled with hydrogen, and outputs an instruction signal for switching the valve to such a state that the heat medium is supplied to the second heat exchanging portion 16b of the hydrogen tanks 13 to each second electromagnetic three way valve 29. Accordingly, heat medium cooled by the radiator 14 becomes of such a state as to be supplied to the second heat exchanging portion 16b of each hydrogen tank 13 without passing through the first heat exchanging portion 16a of the fuel cell 12. In addition, the controller 31 outputs an instruction signal for switching the valve to such a state that the refrigerant liquid is supplied to the refrigerant compressor 33 through the bypass passage 39 to the third electromagnetic three way valve 40 in the air cooling apparatus 15. Accordingly, the third electromagnetic three way valve 40 becomes of such a state that the refrigerant liquid is supplied to the refrigerant compressor 33 through the bypass passage 39.

Accordingly, when the hydrogen tanks 13 are filled with hydrogen, the heat medium that flows through the heat medium passage 16 becomes of such a state as to be cooled by the radiator 14, and cooled also by the heat exchanger 41. In addition, the coupler 55 of the dispenser 53 is linked to the hydrogen filling port 17a, so that the hydrogen tanks 13 are filled with hydrogen from the hydrogen station 51.

Hydrogen gas that is supplied into the hydrogen tanks 13 from the hydrogen multi-cylinder frame reacts with the hydrogen storage alloy MH so as to be converted to hydride, and is stored by the hydrogen storage alloy MH. The storage reaction of hydrogen is an exothermal reaction, and therefore, the storage reaction does not further progress smoothly unless the heat generated as a result of the storage reaction of hydrogen is removed. According to the present embodiment, the heat medium that flows through the heat medium passage 16 is not cooled only by the radiator 14, but also by the heat exchanger 41. This is because when the hydrogen tanks 13 are filled with hydrogen, refrigerant that passes through the expansion valve 35 and thus becomes a mist at a low temperature becomes of such a state as to flow through the bypass passage 39 without being supplied to the evaporator 36, and when the liquid refrigerant evaporates as a result of heat exchange between the liquid refrigerant and the heat medium in the heat exchanger 41, latent heat of evaporation is taken from the surroundings, and thus, the heat medium is cooled. Accordingly, the heat medium does not flow through the first heat exchanging portion 16a of the fuel cell 12, and passes through the main flow portion 16c and the second heat exchanging portions 16b, and thus, circulates between the hydrogen tanks 13 and the radiator 14, and at the same time, is cooled by both the radiator 14 and the heat exchanger 41. Heat medium that is cooled in this manner allows heat generated in the hydrogen storage alloy MH to be removed, so that the storage reaction of hydrogen progresses smoothly. As a result, the hydrogen tanks 13 can be filled with hydrogen to 95% (4.75 kg) or more of hydrogen with which the tank is filled to the fullest (amount when tank is filled to the fullest: 5 kg) in five minutes starting from an empty state under such conditions that, for example, the outside air temperature is 30° C. and the flow rate of the heat medium is 60 L/min.

In addition, the controller 31 controls the displacement of the refrigerant compressor 33 in the air cooling apparatus 15 in response to the temperature of the heat medium that flows through the heat medium passage 16. The controller 31 outputs an instruction signal to the air cooling apparatus controller, so that an appropriate displacement for the refrigerant compressor 33 is sought on the basis of the data stored in a memory, not shown, and the output signal from the temperature sensor 30, and the refrigerant compressor 33 is driven with this displacement. In addition, the air cooling apparatus controller controls the displacement of the refrigerant compressor 33 on the basis of the instruction signal from the controller 31 when the tanks are filled with hydrogen, and operates the refrigerant compressor 33.

In the case where the hydrogen tanks 13 are cooled, control of the refrigerant compressor 33 becomes easy when the refrigerant compressor 33 operates with a constant displacement from when the hydrogen tanks 13 start being filled with hydrogen, so that the heat medium in the heat medium passage 16 is cooled by refrigerant liquid that flows through the bypass passage 39. However, the amount of refrigerant liquid per hour unit that is required, or appropriate, to cool the heat medium in the heat exchanger 41 differs depending on the temperature of the heat medium. Accordingly, in the case where the tanks are filled with hydrogen in a short period of time with the displacement of the refrigerant compressor 33 being constant, the refrigerant compressor 33 is driven until the tanks are completely filled with hydrogen with the displacement selected for when the temperature of the heat medium is the highest, and therefore, energy is consumed wastefully when the temperature of the heat medium is low (when the thermal load is low). According to the present embodiment, however, the refrigerant compressor 33 is driven with the displacement adjusted in accordance with the thermal load, and therefore, the amount of energy consumed can be reduced for the same period of time for filling the tanks with hydrogen, in comparison with the case where the displacement of the refrigerant compressor 33 is constant.

The present embodiment has the following advantages.

(1) The hydrogen tank cooling device for the hydrogen fuel automobile 11 is formed in such a manner that the heat medium used for cooling the fuel cell 12 and the heat medium used for cooling and heating the hydrogen storage alloy MH of the hydrogen tanks 13 flow through the same heat medium passage 16. The hydrogen tank cooling device is provided with a radiator 14 for cooling the heat medium that flows through the heat medium passage 16. In addition, the hydrogen tank cooling device is provided with the bypass passage 39 which branches from the refrigerant circuit 32 in the air cooling apparatus 15 mounted in an automobile. The bypass passage 39 allows expanded refrigerant liquid of such a state to detour the evaporator 36 and be drawn into the refrigerant compressor 33. The hydrogen tank cooling device is provided with a hydrogen storage material cooling portion for cooling the hydrogen storage alloy MH with the refrigerant liquid that flows through the bypass passage 39. Accordingly, the hydrogen tanks 13 can be filled with hydrogen in a short period of time in comparison with a case where the hydrogen storage alloy MH is cooled only by the radiator 14 mounted in the automobile.

(2) The heat exchanger 41, which functions as a hydrogen storage material cooling portion, does not directly cool the hydrogen storage alloy MH with the refrigerant liquid that flows through the bypass passage 39 which branches from the refrigerant circuit 32 in the air cooling apparatus 15. The heat exchanger 41 cools the heat medium that flows through the heat medium passage 16 outside the hydrogen tanks 13, and indirectly cools the hydrogen storage alloy MH with this cooled heat medium. In addition, the bypass passage 39 forms a portion of the heat exchanger 41, which is provided midway along the heat medium passage 16. Accordingly, the heat exchanger 41, which exchanges heat between the refrigerant liquid that flows through the bypass passage 39 and the heat medium that flows through the heat medium passage 16 is provided midway along the heat medium passage 16, without changing the structure of the hydrogen tanks 13, and thus, a hydrogen storage material cooling portion can be easily implemented.

(3) The refrigerant compressor 33 is formed in such a manner that the displacement is variable. The hydrogen tank cooling device is provided with a controller 31 for controlling the displacement of the refrigerant compressor 33 in response to the temperature of the heat medium that flows through the heat medium passage 16. Accordingly, the refrigerant compressor 33 is driven with the displacement adjusted in accordance with the thermal load, and therefore, the amount of energy consumed can be reduced for the same period of time for filling the hydrogen tanks 13 with hydrogen in comparison with a case where the displacement of the refrigerant compressor 33 is constant.

(4) The first electromagnetic three way valve 28 is provided in the heat medium passage 16. The first electromagnetic three way valve 28 can switch between a state where the heat medium flows through the first heat exchanging portion 16*a* of the fuel cell 12 and a state where the heat medium flows through the main flow portion 16*c* without being supplied to the first heat exchanging portion 16*a*, that is to say, a state where the heat medium flows through the second heat exchanging portion 16*b* of the hydrogen tanks 13 without passing through the first heat exchanging portion 16*a*. In addition, when the tanks are filled with hydrogen, the heat medium is cooled by the radiator 14 and the heat exchanger 41 in such a state that the heat medium flows through the second heat exchanging portion 16*b* of the hydrogen tanks 13 without passing through the first heat exchanging portion 16*a* of the fuel cell 12. Accordingly, even in the case where the hydrogen tanks 13 are filled with hydrogen immediately after a state where the fuel cell 12 is used, the heat medium can be immediately switched to such a state as to circulate through the radiator 14, the main flow portion 16*c*, and the hydrogen tanks 13 without passing through the fuel cell 12. Therefore, heat medium that flows through the heat medium passage 16 can be prevented from being heated by heat remaining in the fuel cell 12, and the heat medium can be efficiently cooled.

(5) The heat exchanger 41 is provided in a portion of the main flow portion 16*c* upstream from the upstream one of the second electromagnetic three way valves 29. Accordingly, heat medium cooled by the heat exchanger 41 can be effectively used to cool the hydrogen storage alloy MH inside the respective hydrogen tanks 13. In addition, the hydrogen storage alloy MH inside a hydrogen tank 13 where the temperature is high, that is to say, the hydrogen storage reaction progresses slowly, can be intensively cooled by controlling the second electromagnetic three way valve 29.

(6) The hydrogen fuel automobile 11 is provided with a number of hydrogen tanks 13. The heat medium passage 16 for supplying heat medium to the respective hydrogen tanks 13 is provided with second electromagnetic three way valves 29 corresponding to the second heat exchanging portions 16*b* of the respective hydrogen tanks 13. The respective second electromagnetic three way valves 29 can switch between a state where the heat medium that flows through the heat medium passage 16 is supplied to the second heat exchanging portion 16*b* of the corresponding hydrogen tank 13 and a state where the heat medium is not supplied to this portion. Accordingly, the path through which the heat medium flows can be changed based on an instruction signal from the controller 31, so that the respective hydrogen tanks 13 are in such a state as to have an appropriate temperature, and thus, it becomes easy to appropriately heat and cool the hydrogen storage alloy MH inside the hydrogen tanks 13.

Next, a second embodiment of the present invention will be described in reference to FIG. 3. The present embodiment is different from the above described first embodiment in that refrigerant liquid that flows through the bypass passage 39 exchanges heat with the hydrogen storage alloy MH inside the hydrogen tanks 13 in the hydrogen storage material cooling portion for cooling the hydrogen storage alloy MH with the refrigerant liquid that flows through the bypass passage 39, and thus, the hydrogen storage alloy MH is directly cooled, and the other portions in the configuration are the same. The same symbols are attached to portions which are the same as in the above described first embodiment, and detailed description thereof is omitted.

Figure 3:
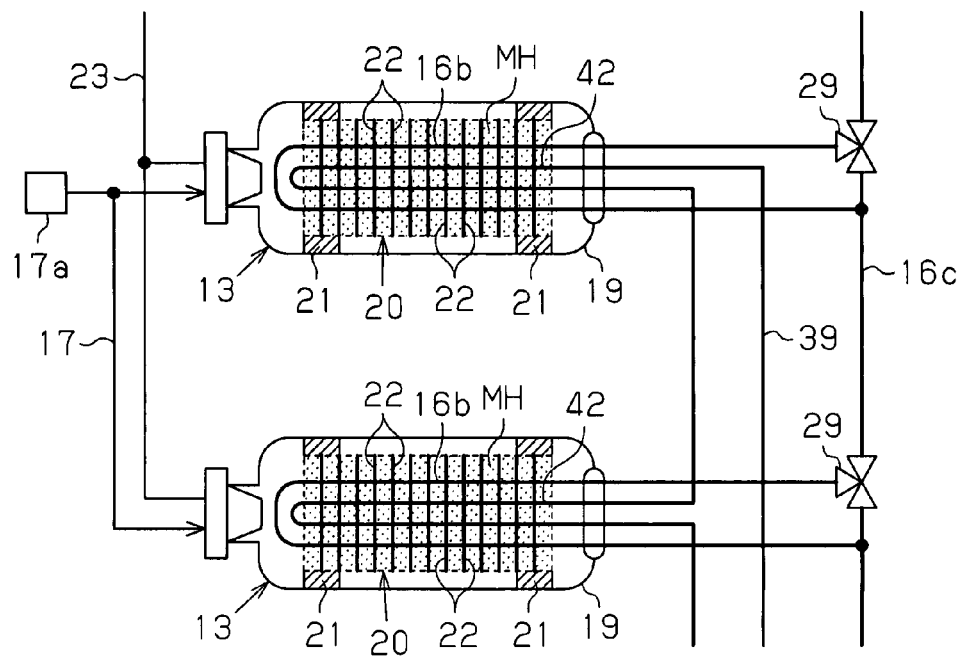
FIG. 3 is a schematic diagram showing the configuration of a hydrogen tank according to a second embodiment of the present invention.

As shown in FIG. 3, a refrigerant pipe 42 is provided in addition to the second heat exchanging portion 16*b* inside each hydrogen tank 13. The refrigerant pipe 42 extends through fins 22 and is secured to the fins 22 by means of welding or the like. The refrigerant pipe 42 is formed as a portion of the bypass passage 39, so that refrigerant liquid that flows through the bypass passage 39 flows through the respective refrigerant pipes 42 in sequence in the configuration. According to this embodiment, the refrigerant liquid in the air cooling apparatus 15 exchanges heat directly with the hydrogen storage alloy MH when flowing through the refrigerant pipe provided inside the hydrogen tank, so that the hydrogen storage alloy MH is cooled.

Accordingly, this embodiment has the following advantages, in addition to advantages similar to the advantages (1), (3), (4), and (6) in the above described first embodiment.

(7) The hydrogen storage material cooling portion for cooling the hydrogen storage alloy MH with the refrigerant liquid that flows through the bypass passage 39 is a refrigerant pipe 42 which is provided inside the hydrogen tanks 13, in addition to the second heat exchanging portion 16*b*, and refrigerant liquid that flows through the bypass passage 39 flows through the refrigerant pipe 42 in the configuration. Accordingly, the refrigerant liquid in the air cooling apparatus 15 flows through the refrigerant pipe 42 provided inside the hydrogen tanks 13, and therefore, the effects of cooling the hydrogen storage alloy MH with the refrigerant liquid in the air cooling apparatus 15 improve in comparison with such configurations as in the first embodiment, where the hydrogen storage alloy MH is cooled indirectly.

The embodiments are not limited to the above, and may, for example, be modified as follows.

Figure 4A:
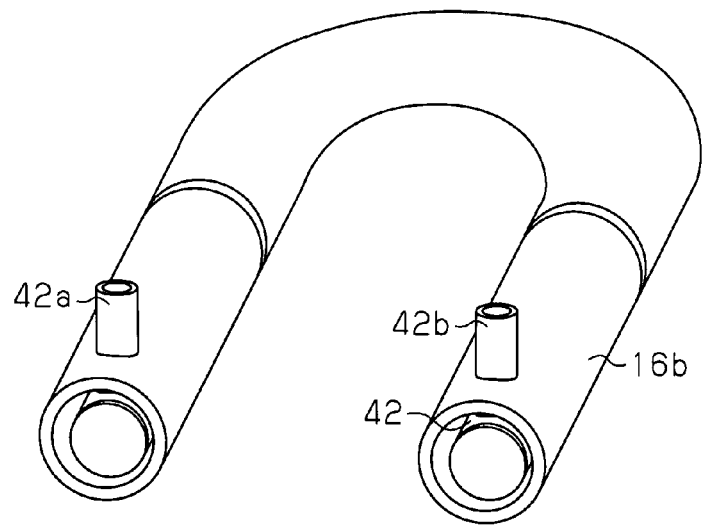
FIG. 4A is a schematic perspective view showing a heat exchanging portion and a refrigerant pipe according to another embodiment of the present invention.
Figure 4B:
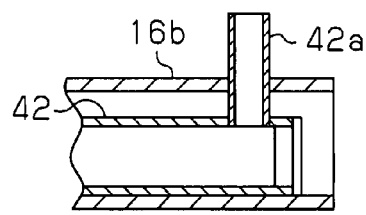
FIG. 4B is a cross-sectional view showing a portion of FIG. 4A.

The refrigerant pipe 42 for causing the refrigerant liquid that flows through the bypass passage 39 to flow into the hydrogen tank 13 does not need have such a configuration as to be completely independent of the second heat exchanging portion 16b as in the second embodiment, but may be configured such that the second heat exchanging portion 16b and the refrigerant pipe 42 are provided as a double pipe. As shown in FIGS. 4A and 4B, for example, a double pipe having a configuration where a refrigerant pipe 42 in U shape having a small diameter is inserted into a pipe in U shape which serves as the second heat exchanging portion 16b is used. The inlet portion 42a and the outlet portion 42b of the refrigerant pipe 42 are formed so as to extend through the pipe wall of the second heat exchanging portion 16b in such a state as to cross the U shaped pipe of the refrigerant pipe 42 at the end portions in such a manner as to be perpendicular to the U shaped pipe. In addition, bypass passages 39 are linked to the inlet portion 42a and the outlet portion 42b of the refrigerant pipe 42. A portion of the refrigerant pipe 42 is placed in such a state as to contact the inner surface of the second heat exchanging portion 16b. In this case, some of the refrigerant liquid that flows through the refrigerant pipe 42 exchanges heat with the heat medium in the second heat exchanging portion 16b, and some of the refrigerant liquid exchanges heat with the hydrogen storage alloy MH through the pipe wall of the second heat exchanging portion 16b.

That is to say, in FIGS. 4A and 4B, the lower portion of the refrigerant pipe 42 contacts the inner surface of the lower portion of the second heat exchanging portion 16b. Refrigerant liquid that flows through the upper portion in the refrigerant pipe 42 exchanges heat with the heat medium in the second heat exchanging portion 16b, and refrigerant liquid that flows through the lower portion in the refrigerant pipe 42 exchanges heat with the hydrogen storage alloy MH through the pipe wall of the second heat exchanging portion 16b. Accordingly, some of the refrigerant liquid cools the hydrogen storage alloy MH without using the heat medium, and therefore, the efficiency when the hydrogen alloy MH is cooled becomes high in comparison with a case where a heat exchanger 41 is provided.

Figure 5A:
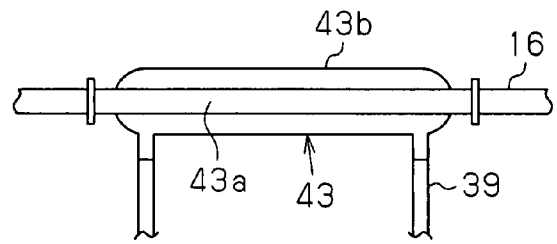
FIG. 5A is a schematic diagram showing a heat exchanger according to still another embodiment of the present invention.

The heat exchanger for exchanging heat between the heat medium that flows through the heat medium passage 16 and the refrigerant liquid that flows through the bypass passage 39 is not limited to having such a configuration that heat is transferred through the walls of the pipe for defining the heat medium passage 16 and the walls of the pipe for defining the bypass passage 39 like the heat exchanger 41 according to the first embodiment. As shown in FIG. 5A, for example, a double tube type heat exchanger 43 is provided midway along the heat medium passage 16, and the heat medium passage 16 and the bypass passage 39 may be provided in such a manner that the inside pipe 43a defines a portion of the heat medium passage 16 and the outside pipe 43b defines a portion of the bypass passage 39. In this case, the heat medium and the refrigerant liquid exchange heat through the walls of one pipe 43a, and therefore, heat can be exchanged efficiently in comparison with the first embodiment, according to which heat is exchanged through two pipe walls: the pipe wall of the heat medium passage 16 and the pipe wall of the bypass passage 39.

Figure 5B:
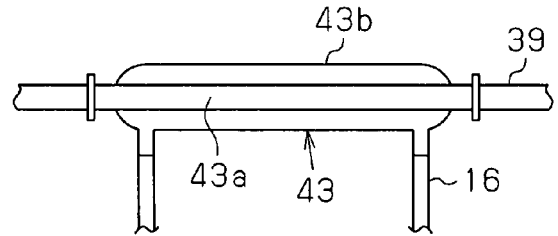
FIG. 5B is a schematic diagram showing a heat exchanger according to yet another embodiment of the present invention.

As shown in FIG. 5B, a double pipe type heat exchanger 43 is provided midway along the bypass passage 39, and the heat medium passage 16 and the bypass passage 39 may be provided in such a manner that the inside pipe 43a defines a portion of the bypass passage 39 and the outside pipe 43b defines a portion of the heat medium passage 16. In this case also, the heat medium and the refrigerant liquid exchange heat through the walls of one pipe 43a, and therefore, heat can be exchanged efficiently in comparison with the first embodiment, according to which heat is exchanged through two pipe walls.

In the case where a heat exchanger 41 or a heat exchanger 43 is provided outside the hydrogen tanks 13, the heat exchanger 41 or heat exchanger 43 may be provided at the inlet of the second heat exchanging portion 16b for the upstream one of the hydrogen tanks 13, instead of upstream from the upstream one of the second electromagnetic three way valves 29. In addition, the heat exchanger 41 or heat exchanger 43 may be provided at every inlet of the second heat exchanging portion 16b, for each hydrogen tank 13. In this case, though the hydrogen tank cooling device has a number of heat exchangers 41 or heat exchangers 43 as a whole, these heat exchangers 41 or heat exchangers 43 may be connected to the bypass passage 39 in series or connected in parallel, or series connection and parallel connection may be combined. An electromagnetic three way valve or the like may be additionally provided midway along the bypass passage 39, so that the valve can be controlled in such a manner that the refrigerant liquid selectively flows through the number of heat exchangers 41 or heat exchangers 43.

The above described first electromagnetic three way valve 28 may be omitted, and the heat medium passage 16 may be formed in such a manner that the heat medium passes through the fuel cell 12 so as to be supplied to the hydrogen tanks 13 without fail.

The above described number of second electromagnetic three way valves 29 may all be omitted, and the heat medium passage 16 may be formed in such a manner that the heat medium is supplied to the second heat exchanging portion 16b inside all the hydrogen tanks 13 without fail.

Though the heat medium passage 16 is formed so that the above described second heat exchanging portions 16b are connected in series, the second heat exchanging portions 16b may be connected in parallel in the configuration, or series connection and parallel connection may be combined.

Though the bypass passage 39 is formed so as to connect the above described number of refrigerant pipes 42 in series, a number of refrigerant pipes 42 may be connected in parallel in the configuration, or series connection and parallel connection may be combined.

The refrigerant in the above described air cooling apparatus 15 is not limited to chlorofluorocarbons, and may be, for example, carbon dioxide. In the case where the refrigerant is carbon dioxide, the pressure of the refrigerant that flows through the bypass passage 39 is high in comparison with chlorofluorocarbons, and therefore, in the case where carbon dioxide is used as the refrigerant in the second embodiment, the internal pressure of the refrigerant pipe 42 increases, and therefore, it becomes possible to reduce the strength required for the refrigerant pipe 42 to resist the internal pressure of the tank that works from the outside of the refrigerant pipe 42 inside the hydrogen tank 13.

The number of hydrogen tanks/13 mounted in the above described hydrogen fuel automobile 11 is not limited to two, and may be one, three, or more. That is to say, the fuel cell 12 may be connected to a number of hydrogen tanks 13 in the configuration, or hydrogen may be supplied to the fuel cell 12 from one hydrogen tank 13 in the configuration.

In the case where a number of hydrogen tanks 13 as those described above are mounted, the configuration is not limited to one where the respective hydrogen tanks 13 are simultaneously filled with hydrogen gas through pipes 17, and a valve may be provided in every pipe which branches to a hydrogen tank 13, making it possible to fill the hydrogen tanks 13 one after another.

The pressure inside the cylinders 54a of the above described hydrogen multi-cylinder frame and the hydrogen tanks 13 of the hydrogen fuel automobile 11 when filled to the fullest is not limited to the above described pressure. Some hydrogen tanks 13 mounted in the fuel cell automobile may have, for example, a pressure of 25 MPa when filled to the fullest, and in this case, the pressure inside the cylinders 54a of the hydrogen multi-cylinder frame may be lower than 44 MPa.

The above described fuel cell 12 is not limited to a solid polymer type fuel cell, and may be a fuel cell where a heat medium is used to cool the fuel cell, such as a phosphoric acid type fuel cell or an alkaline type fuel cell.

The above described hydrogen tanks 13 may have such a configuration that a hydrogen storage material other than a hydrogen storage alloy, for example activated carbon fibers or single layer carbon nanotubes, is contained.

The above described hydrogen fuel automobile 11 is not limited to a fuel cell automobile in which a fuel cell 12 is mounted as a hydrogen fuel drive portion, and may be a hydrogen engine automobile in which a hydrogen engine is mounted.

The gas storing installation 52 in the above described hydrogen station 51 is not limited to one formed of a hydrogen multi-cylinder frame made of a number of cylinders 54a which are filled with hydrogen gas under pressure which is greater than the pressure inside the hydrogen tanks 13 when filled to the fullest. A high pressure tank which is larger than the cylinders 54a, for example, may be used in the gas storing installation 52.

The above described hydrogen station 51 may have such a configuration that the cylinders 54a in the gas storing installation 52 and the tank are filled with hydrogen gas under pressure which is lower than the pressure when the hydrogen tanks 13 are filled to the fullest, and hydrogen gas in the cylinders 54a or the tank is compressed and pressure is applied in the compressor before the hydrogen gas is supplied to the hydrogen tanks 13. In this case, it is not necessary to store a large amount of hydrogen gas in the hydrogen station 51 under high pressure from the start.

The invention claimed is:

1. A hydrogen tank cooling device for a hydrogen fuel automobile, the hydrogen fuel automobile comprising:
    a hydrogen tank containing a hydrogen storage material and having a heat exchanger inside, the heat exchanger including a heat medium pipe through which a heat medium flows;
    a drive portion for driving the vehicle using hydrogen supplied from the hydrogen tank as fuel;
    a heat medium passage through which flows the heat medium which can exchange heat with the drive portion and can be supplied to the heat medium pipe;
    a radiator for cooling the heat medium which flows through the heat medium passage; and
    an air cooling apparatus that includes a compressor for compressing a refrigerant gas, a condenser for condensing the compressed refrigerant gas using a fan, an evaporator for making expanded refrigerant liquid evaporate thereby cooling air sent by another fan by latent heat of evaporation in the refrigerant, and a refrigerant circuit, wherein the refrigerant circuit is provided with the compressor, condenser, and evaporator,
    wherein the hydrogen tank cooling device comprising:
    a bypass passage which branches from the refrigerant circuit such that expanded refrigerant liquid detours the evaporator so as to be drawn into the compressor;
    a switch portion that can switch between a state where the expanded refrigerant liquid passes through the evaporator so as to be drawn into the compressor and a state where the expanded refrigerant liquid detours the evaporator so as to flow through the bypass passage; and
    a hydrogen storage material cooling portion for cooling the hydrogen storage material using the expanded refrigerant liquid that flows through the bypass passage,
    wherein the switch portion is a first switch portion, and the hydrogen tank cooling device further comprises a second switch portion which can switch between a state where the heat medium flows through the heat medium pipe after cooling the drive portion and a state where the heat medium flows through the heat medium pipe without passing through the drive portion.

2. The hydrogen tank cooling device according to claim 1, wherein
    the hydrogen storage material cooling portion exchanges heat between the expanded refrigerant liquid that flows through the bypass passage and the heat medium that flows through the heat medium passage.

3. The hydrogen tank cooling device according to claim 1, wherein
    the drive portion is a hydrogen fuel cell.

4. A hydrogen tank cooling device for a hydrogen fuel automobile, the hydrogen fuel automobile comprising:
    a hydrogen tank containing a hydrogen storage material and having a heat exchanger inside, the heat exchanger including a heat medium pipe through which a heat medium flows;
    a drive portion for driving the vehicle using hydrogen supplied from the hydrogen tank as fuel;
    a heat medium passage through which flows the heat medium which can exchange heat with the drive portion and can be supplied to the heat medium pipe;
    a radiator for cooling the heat medium which flows through the heat medium passage; and
    an air cooling apparatus that includes a compressor for compressing a refrigerant gas, a condenser for condensing the compressed refrigerant gas using a fan, an evaporator for making expanded refrigerant liquid evaporate cooling air sent by another fan by latent heat of evaporation in the refrigerant, and a refrigerant circuit, wherein the refrigerant circuit is provided with the compressor, condenser, and evaporator,
    wherein the hydrogen tank cooling device comprising:
    a bypass passage which branches from the refrigerant circuit such that expanded refrigerant liquid detours the evaporator so as to be drawn into the compressor;
    a switch portion that can switch between a state where the expanded refrigerant liquid passes through the evaporator so as to be drawn into the compressor and a state where the expanded refrigerant liquid detours the evaporator so as to flow through the bypass passage; and
    a hydrogen storage material cooling portion for cooling the hydrogen storage material using the expanded refrigerant liquid that flows through the bypass passage,
    wherein
    the hydrogen storage material cooling portion includes a refrigerant pipe provided inside the hydrogen tank, and the expanded refrigerant liquid that flows through the bypass passage flows through the refrigerant pipe.

5. The hydrogen tank cooling device according to claim 4, wherein
    the hydrogen storage material cooling portion includes a double pipe having an inside pipe and an outside pipe, so that the heat medium pipe is one of the inside pipe and the outside pipe and the refrigerant pipe is the other.

6. The hydrogen tank cooling device according to claim 5, wherein a portion of the inside pipe contacts the outside pipe.

7. A hydrogen tank cooling device for a hydrogen fuel automobile, the hydrogen fuel automobile comprising:
a hydrogen tank containing a hydrogen storage material and having a heat exchanger inside, the heat exchanger including a heat medium pipe through which a heat medium flows;
a drive portion for driving the vehicle using hydrogen supplied from the hydrogen tank as fuel;
a heat medium passage through which flows the heat medium which can exchange heat with the drive portion and can be supplied to the heat medium pipe;
a radiator for cooling the heat medium which flows through the heat medium passage; and
an air cooling apparatus that includes a compressor for compressing a refrigerant gas, a condenser for condensing the compressed refrigerant gas using a fan, an evaporator for making expanded refrigerant liquid evaporate cooling air sent by another fan by latent heat of evaporation in the refrigerant, and a refrigerant circuit, wherein the refrigerant circuit is provided with the compressor, condenser, and evaporator,
wherein the hydrogen tank cooling device comprising:
a bypass passage which branches from the refrigerant circuit such that expanded refrigerant liquid detours the evaporator so as to be drawn into the compressor;
a switch portion that can switch between a state where the expanded refrigerant liquid passes through the evaporator so as to be drawn into the compressor and a state where the expanded refrigerant liquid detours the evaporator so as to flow through the bypass passage; and
a hydrogen storage material cooling portion for cooling the hydrogen storage material using the expanded refrigerant liquid that flows through the bypass passage,
wherein
the compressor is a variable displacement compressor, and
the hydrogen tank cooling device further comprises a control portion for controlling the displacement of the variable displacement compressor in accordance with the temperature of the heat medium.

8. A hydrogen fuel automobile, comprising:
a hydrogen tank containing a hydrogen storage material and having a heat exchanger inside, the heat exchanger including a heat medium pipe through which a heat medium flows;
a drive portion for driving the vehicle using hydrogen supplied from the hydrogen tank as fuel;
a heat medium passage through which flows the heat medium which can exchange heat with the drive portion and can be supplied to the heat medium pipe;
a radiator for cooling the heat medium which flows through the heat medium passage;
an air cooling apparatus that includes a compressor for compressing an expanded refrigerant gas, a condenser for condensing the compressed refrigerant gas using a fan, an evaporator for making expanded refrigerant liquid evaporate thereby cooling air sent by another fan by latent heat of evaporation in the refrigerant, and a refrigerant circuit, wherein the refrigerant circuit is provided with the compressor, condenser, and evaporator;
a bypass passage which branches from the refrigerant circuit such that expanded refrigerant liquid detours the evaporator so as to be drawn into the compressor;
a switch portion that can switch between a state where the expanded refrigerant liquid passes through the evaporator so as to be drawn into the compressor and a state where the expanded refrigerant liquid detours the evaporator so as to flow through the bypass passage; and
a hydrogen storage material cooling portion for cooling the hydrogen storage material using the expanded refrigerant liquid that flows through the bypass passage,
wherein the switch portion is a first switch portion, and the hydrogen tank cooling device further comprises a second switch portion which can switch between a state where the heat medium flows through the heat medium pipe after cooling the drive portion and a state where the heat medium flows through the heat medium pipe without passing through the drive portion.

* * * * *